US010049424B2

(12) United States Patent
Yuan (10) Patent No.: US 10,049,424 B2
(45) Date of Patent: Aug. 14, 2018

(54) METHOD AND DEVICE FOR POST PROCESSING OF A VIDEO STREAM (71) Applicant: Axis AB, Lund (SE)

(72) Inventor: Song Yuan, Sodra Sandby (SE)

(73) Assignee: AXIS AB, Lund (SE)

( * ) Notice: Subject to any disclaimer, the term of this patent is extended or adjusted under 35 U.S.C. 154(b) by 121 days.

(21) Appl. No.: 14/956,499

(22) Filed: Dec. 2, 2015

(65) Prior Publication Data

US 2016/0165282 A1 Jun. 9, 2016

(30) Foreign Application Priority Data

Dec. 4, 2014 (EP) ..................................... 14196324

(51) Int. Cl.
H04N 21/2343 (2011.01)
H04N 21/24 (2011.01)
H04N 21/258 (2011.01)
H04N 21/414 (2011.01)
G06T 1/20 (2006.01)
H04N 21/431 (2011.01)
H04N 19/85 (2014.01)

(52) U.S. Cl.
CPC ....... *G06T 1/20* (2013.01); *H04N 21/234345* (2013.01); *H04N 21/2402* (2013.01); *H04N 21/25833* (2013.01); *H04N 21/41407* (2013.01); *H04N 21/4318* (2013.01); *H04N 19/85* (2014.11)

(58) Field of Classification Search
CPC .......... G06T 15/005; G09G 2320/0271; G09G 2350/00; G09G 2360/08; A63F 13/355; A63F 13/45; G06F 9/5044; G06F 9/505; H04N 19/436; H04N 19/44; H04N 21/239; H04N 21/25; H04N 21/2662; H04N 21/4223; H04N 21/42653; H04N 21/647; H04N 21/8166; H04N 21/8451
See application file for complete search history.

(56) References Cited

U.S. PATENT DOCUMENTS

| 2005/0243094 | A1* | 11/2005 | Patel ..................... G06T 15/005 345/506 |
| 2007/0071343 | A1* | 3/2007 | Zipnick .................... H04N 5/21 382/254 |
| 2007/0124783 | A1 | 5/2007 | Ahiska et al. |
| 2007/0183678 | A1* | 8/2007 | Sankar ..................... G06F 3/14 382/254 |
| 2012/0092353 | A1 | 4/2012 | Paltashev et al. |
| 2012/0169842 | A1 | 7/2012 | Chuang et al. |
| 2013/0016107 | A1* | 1/2013 | Dharmapurikar ....... G06F 9/505 345/501 |
| 2013/0038618 | A1 | 2/2013 | Urbach |
| 2014/0035900 | A1 | 2/2014 | Slavin, III et al. |

(Continued)

OTHER PUBLICATIONS

EP 14 19 6324.9 European Search Report (dated Jun. 16, 2015).

(Continued)

*Primary Examiner* — Hai V Tran
(74) *Attorney, Agent, or Firm* — Volpe and Koenig, P.C.

(57) ABSTRACT

The present invention relates to the field of processing a video stream, and more particular to the field of post processing of a video stream using shaders. The processing of the video stream is divided between a video stream processing device and a client device.

16 Claims, 6 Drawing Sheets (56) References Cited

U.S. PATENT DOCUMENTS

2014/0173574 A1   6/2014  Schmidt et al.
2014/0173674 A1*  6/2014  Wolman ................. H04N 21/25
                                                         725/116
2015/0087414 A1*  3/2015  Chen .................... A63F 13/355
                                                          463/31

OTHER PUBLICATIONS

"Study of Reconfigurable Video Coding V1.0"; Jang et al.; ISO/IEC JTC1/SC29/WG11; MPEG2006/N7819, Bangkok, Jan. 16-20, 2006.

* cited by examiner

METHOD AND DEVICE FOR POST PROCESSING OF A VIDEO STREAM

FIELD OF INVENTION

The present invention relates to the field of processing a video stream, and more particular to the field of post processing of a video stream using shaders.

BACKGROUND

Today, many of the video processing systems follow a standard architecture that typically include a sever that receives a video stream, processes the video stream, and then transmits the processed video stream, via a network, to a remote client.

It may be advantageous for computational reasons and for increasing performance to use processing power of both the server and the remote client.

Some of the processing relate to processing made by a graphical processing unit (GPU). The GPU creates images intended for output to a display. The GPU may also be adapted to manipulate images in a video stream. In a server-client system, it may be advantageous to be able to use the GPU both on the server and on the client for performing graphical processing.

US 2013/0016107 (CiiNow Inc.) relates to a method for rendering graphics that can utilize both server-side rendering and client-side rendering. The main idea in this document is to decide if the rendering should be made on the server or on the client. If the rendering is made on the server, video data (i.e. pixel data) is sent from the server to the client and then displayed. If the rendering is made on the client, graphics data (i.e. vector data) is sent to the client and then rendered into video data using the GPU of the client. The choice is made based on the available processing power of the GPU in the client and in the server and based on the network bandwidth.

The method of US 2013/0016107 may be advantageous in application where graphics data is processed and rendered into video data, e.g. computer games. Different approaches are needed in order to process video data both on the server and on the client, for example by applying shaders for special effects and video post processing.

SUMMARY

In view of the above, an objective of the invention is to solve or at least reduce one or several of the drawbacks discussed above. Generally, the above objective is achieved by the attached independent patent claims.

According to a first aspect, the present invention is realized by a method for processing a video stream in a system comprising a video stream processing device connected to a client device, comprising: setting one or more shaders to be applied to the video stream, applying, by a first processing, at the video stream processing device, at least one of the one or more shaders to at least a subset of the video stream, applying, by a second processing, at the client device, at least one of the one or more shaders to at least a subset of the video stream, wherein the at least one of the one or more shaders applied in the second processing is transmitted from the video stream processing device to the client device.

Shaders are computer programs used in computer graphics. Shaders are for example used for special effects and video post processing. There are various sorts of shaders, for example Vertex shaders that may be used for perspective transforms, Pixel shaders that may be used for altering pixel colors and positions, and Compute shaders that may be used for video analytics computations. A shader requires a compatible graphical processing unit (GPU) to be executed. For example, all GPUs do not support Compute shaders. The GPU may support OpenGL which is a multi-platform application programming interface (API) for rendering 2D and 3D vector graphics.

By the term "processing" should, in the context of present specification be understood the execution of shaders on the at least a subset of the video stream that the processing relate to.

A client device may be a device, having a GPU, running a web application from a web server and displaying the processed video stream, for example a tablet computer or a Smartphone. A client device may also refer to a device which processes the video stream using its GPU and subsequently sends it to a display for viewing purposes. An example of such a device could be a PC with a connected display that would display the processed video stream in same way as a tablet computer or a Smartphone, but in this case on a display connected to the computer whereas a tablet computer or a Smartphone would use its embedded display for the same purposes. The client device may also be used in a Video Management System (VMS) for managing and viewing video from a monitoring system comprising one or more cameras. A VMS could be based on a variety of technologies e.g. including cloud based systems (e.g. through various cloud-based video hosting services), systems based on central servers (e.g. "Axis Camera Station" produced by Axis Communications AB) or server-less systems where software installed on the cameras of the system handle the video management (e.g. "Axis Camera Companion" produced by Axis Communications AB). The client device would in this case be connected to the VMS.

By the term "subset of the video stream" should, in the context of the present specification be understood that not the entire video stream needs to be processed at the video stream processing device and/or the client device. The processing at the video stream processing device and the processing at the client device can relate to (different) parts of a frame (e.g. half the frame), or (different) subset of frames (e.g. every other frame in the video stream), or a mix of the two. According to other embodiments, the first and second processing both processes the entire video stream.

The present invention is based upon the realization that by providing all shaders at the video stream processing device, and let the video stream processing device transmit shaders needed for the processing at the client device, an increased flexibility for the first and second processing is achieved. In other words, the execution of the shaders can be divided dynamically at runtime, based e.g. on the network topology, the capabilities and load of both the video stream processing device and the client device, and characteristics of the use case. Alternatively, the division of the execution can be static.

According to some embodiments, the first processing is different from the second processing. This may advantageously divide the processing required for the execution of the one or more shaders on the video stream between the video stream processing device and the client device.

According to some embodiments, the at least one shader applied in the first processing differs from the at least one shader applied in the second processing. For example, any vertex shader(s) can be executed on the video stream processing device and any pixel shader(s) can be executed on the client device.

According to some embodiments, said at least a subset of the video stream to which the first processing relate differs from said at least a subset of the video stream to which the second processing relate. As mentioned above, the processing at the video stream processing device and the processing at the client device can relate to different parts of a frame (e.g. half the frame is processed in the video stream processing device and the remaining half is processed on the client device), or different subset of frames (e.g. every other frame in the video stream is processed on the video stream processing device and the remaining frames is processed on the client device).

However, it should be noted that according to some embodiments, the first processing and the second processing are not different from each other, i.e. the same shaders are applied to the same parts of the video stream both on the video stream processing device and the client device. This may be advantageous when the first and second processing relate to incremental filtering. In this case, the execution of the shaders is still divided between the video stream processing device and the client device since the first part of the incremental filtering is executed on the video stream processing device and the second part of the incremental filtering is executed on the client device.

According to some embodiments, the first processing and/or the second processing depends on at least one from the group of: a type of a graphics processing unit, GPU, of the client device, and a type of a graphics processing unit, GPU, of the video stream processing device. As mentioned above, different types of GPUs may support different types of shaders. For example, normally only the GPU in the client device supports Tessellation or Geometry shaders. Since a Vertex shader needs to be executed before a Tessellation and/or a Geometry shader, the division of the execution may be done such that the Vertex shader is executed on the video stream processing device and the Tessellation and Geometry shaders are executed on the client device.

According to some embodiments, the first processing and/or the second processing changes over the duration of the video stream. This may further increase the flexibility of the inventive method since the division of the shader execution between the video stream processing device and the client device could be independently determined for each time period of the video stream and thus advantageously follow changes in the network topology, changes of load and other important properties of both the video stream processing device and the client device, and changed use cases (e.g. latency demands of the execution).

For example, the first processing and/or the second processing may dynamically change over the duration of the video stream based on information pertaining to at least one from a group consisting of: bandwidth of the connection between the video stream processing device and the client device, battery level of the client device, battery level of the video stream processing device, processing power of the GPU of the client device, and processing power of the GPU of the video stream processing device.

The client device may, as mentioned above, be a battery driven device such as a tablet computer. Since execution of shaders may drain the battery of the client device, it may be advantageous if the video stream processing device, in the case where the client device is running short of battery, runs a larger part of the required processing for executing the one or more shaders on the video stream.

According to some embodiments, the video stream is transmitted as an encoded video stream from the video stream processing device to the client device where the video stream is decoded before the second processing. This is advantageous since the video stream will be encoded and transmitted to the client device no matter what processing that is applied at the video stream processing device. For example, the video stream may be semi processed when encoded and transmitted to the client device. Moreover, the present embodiment is advantageous in that the execution flow of the shaders can be easily set up and maintained, since the encoder in the video stream processing device (and a corresponding decoder on the client device) are constantly running. A further advantage may be that the basic system layout with an encoder in the video stream processing device and a decoder in the client device do not change according to this embodiment. Further, the network load may be relatively steady, no matter how execution of the one or more shaders is divided between the video stream processing device and the client device.

According to some embodiments, the transmission of the video stream has a first priority level, and the transmission of the at least one of the one or more shaders applied in the second processing from the video stream processing device to the client device has a second priority level lower than the first priority level. Consequently, an order of performing the transmissions is based on their respective priority level. According to this embodiment, the transmission of the video stream is always prioritized over the transmission of the shaders to be applied in the client device. This may reduce the risk of sluttering when the video stream is displayed at a display connected to the client device or in the client device. According to this embodiment, the shaders in the second processing will not be applied to the frames of the video stream that has already been transmitted before the shaders of the second processing are transferred.

According to some embodiments, the transmission of the video stream is performed via a first network connection, and wherein the transmission of the at least one of the one or more shaders applied in the second processing from the video stream processing device to the client device is performed via a second network connection different from the first network connection. For example, the video stream may be transmitted via a Real Time Streaming Protocol (RTSP) connection or Hypertext Transfer Protocol (HTTP) connection while the shaders may be transmitted via a socket or HTTP connection.

According to some embodiments, the video stream processing device comprises a plurality of threads of execution, and wherein the transmission of the video stream is performed by executing a first thread, and wherein the transmission of the at least one of the one or more shaders applied in the second processing is performed by executing a second thread different from the first thread. This may further facilitate that the video stream is transmitted prioritized to the transmission of the shaders of the second processing.

According to some embodiments, the method further comprises the steps of: receiving, at the video stream processing device, from the client device, a request for a video stream to be transmitted from the video stream processing device to the client device, and extracting, at the video stream processing device, information pertaining to the client device from the request, the information pertaining to the client device comprises at least information of a type of a GPU of the client device, wherein the first processing and/or the second processing depends on the extracted information.

By extracting information needed for the division of shader execution already from the request of a video stream from the client device, determination of the first processing and the second processing may be performed early.

According to some embodiments, the video stream processing may include a request for information pertaining to the client device in the response to the request for the video stream sent by the client device. The video stream processing device may for example request the information via JavaScript included in the response. When the client device receives this response, it may provide the requested information in a further communication sent to the video processing device.

In a second aspect, the present invention provides a video stream processing device for processing a video stream, comprising: a memory for storing one or more shaders to be applied to the video stream, a shader handling unit for determining: a first processing relating to at least a subset of the video stream to which at least one of the one or more shaders is to be applied, and a second processing relating to at least a subset of the video stream to which at least one of the one or more shaders is to be applied. The video stream processing device further comprises a graphical processing unit, GPU, for performing the first processing, and, a digital network module configured to transmit the at least one of the one or more shaders to be applied in the second processing, and data pertaining to the at least a subset of the video stream to which the second processing relate.

The video processing device may advantageously be a part of a digital video camera, wherein the video stream is acquired by the digital video camera. This reduces the need of further electronic devices connected to the video camera and is e.g. advantageous for assembling reasons and for reducing the required space for mounting the video stream processing device and the camera.

In a third aspect, the present invention provides a system for processing a video stream, comprising: a video stream processing device comprising: a memory for storing one or more shaders to be applied to the video stream, a shader handling unit for determining: a first processing relating to at least a subset of the video stream to which at least one of the one or more shaders is to be applied, and a second processing relating to at least a subset of the video stream to which at least one of the one or more shaders is to be applied. The video processing device further comprises a graphical processing unit, GPU, for performing the first processing, an encoder configured to encode the video stream into a encoded video stream, and a digital network module configured to transmit, via a digital network, the at least one of the one or more shaders to be applied in the second processing, data pertaining to the at least a subset of the video stream to which the second processing relate, and the encoded video stream. The system further comprises a client device comprising: a digital network module configured to receive, via the digital network, the at least one of the one or more shaders to be applied in the second processing, data pertaining to the at least a subset of the video stream to which the second processing relate, and the encoded bitstream, a decoder configured to decode the encoded video stream into a video stream, and a GPU for performing the second processing using the received at least one of the one or more shaders and the received data pertaining to the at least a subset of the video stream to which the second processing relate.

In a fourth aspect, the present invention provides a computer program product comprising a computer-readable storage medium with instructions adapted to carry out the method according to the first aspect when executed by a device having processing capability.

The second, third and fourth aspect may generally have the same features and advantages as the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF THE PREFERRED EMBODIMENTS

Figure 1:
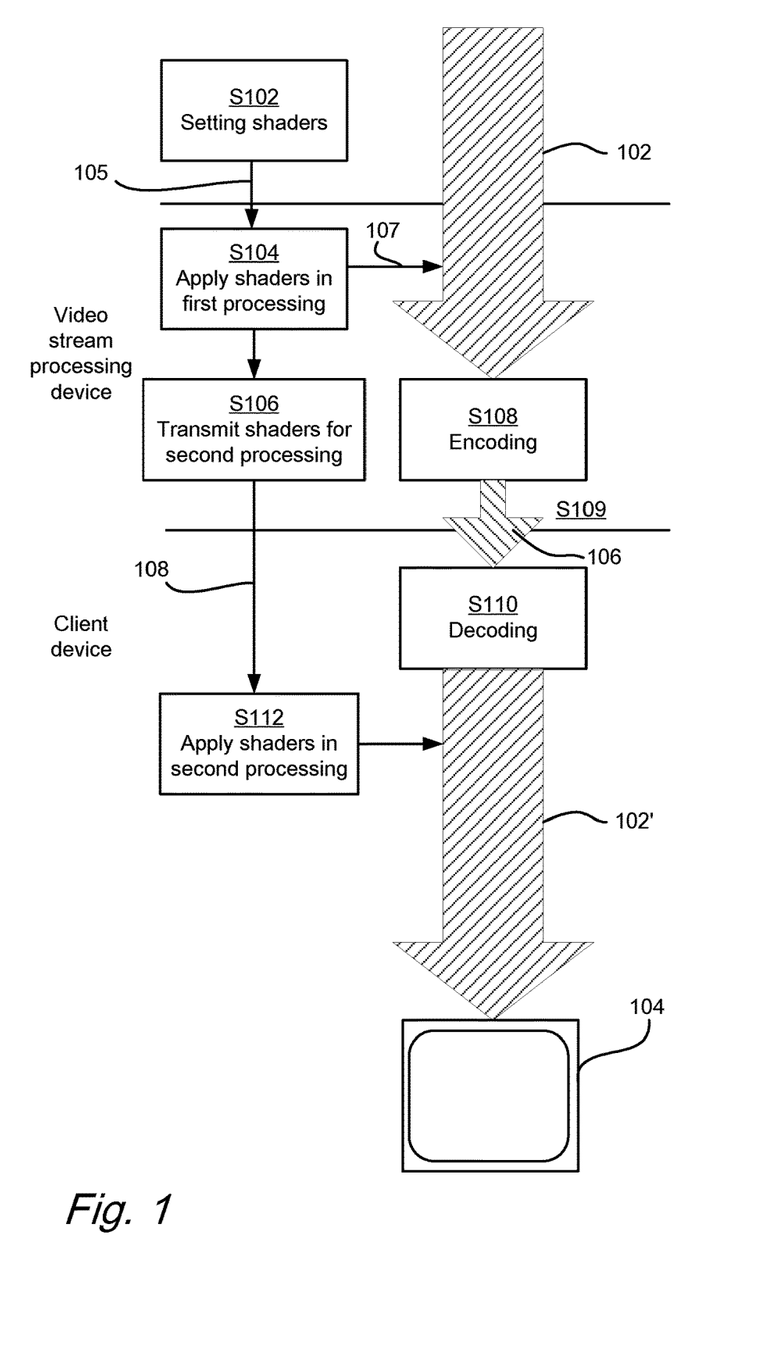
FIG. 1 describes a flow chart of processing of a video stream using shaders, wherein the processing is divided between a video processing device and a client device.

FIG. 1 describes by way of example a flow chart of processing of a video stream using shaders. The first step in the flow chart is the step of setting S102 one or more shaders 105 to be applied to a video stream 102. As described in FIG. 1, the video stream 102 may be acquired outside the video stream processing device and transmitted to the video stream processing device. According to some embodiments, the video stream processing device is a digital video camera. In this case the video stream 102 is acquired by the digital video camera and consequently not transmitted into the video stream processing device as described in FIG. 1. However, according to other embodiments, the video stream processing device is a device separate from the video camera acquiring the video stream 102. In this case, the connection between the video stream processing device and the video camera may be a wired connection or a wireless connection.

Moreover, the step of setting S102 the shaders 105 is in FIG. 1 made outside the video stream processing device, for example in a pre-processing step where the video stream 102 is analyzed and where the shaders 105 to be applied is determined based on the analysis. In other embodiments, the step of setting S102 the shaders 105 is performed in the video stream processing device. According to yet another embodiment, the one or more shaders are fixed shaders that are always applied to the video stream and may consequently be hardcoded into the video stream processing device.

The application of the one or more shaders 105 to the video stream 102 is divided into a first and a second processing step. The dividing into two processing steps will be described further below. The first processing will be performed by the video stream processing device, and the second processing will be performed by a client device which is connected to the video stream processing device. The connection between the video stream processing device and the client device may be a wired connection or a wireless connection.

The next step in the flow chart described in FIG. 1 is the step of applying S104, by the first processing, at the video stream processing device, at least one 107 of the one or more shaders 105 (that were set in S102 previously) to at least a subset of the video stream 102. This step is performed using a GPU of the video stream processing device as will be described more in detail below.

Further, the shader(s) 108 needed for the second processing is transmitted S106 from the video stream processing device to the client device. It should be noted that if the second processing comprises texture mapping using a texture, the texture may also be transmitted as part of the transmission S106 of the shader(s) 108 needed for the second processing or as a separate transmission (not shown).

As clearly seen in FIG. 1, the flow chart comprises two separate tracks. One track for the application of the one or more shaders 105 on the video stream 102, 102' and any transmission of the one or more shaders 105 from the video stream processing device and the client device, and one track for encoding S108 the video stream 102 at the video stream processing device, transmitting S109 the encoded video stream 106 to the client device and decoding S110 the encoded video stream 106 at the client device. In other words, the video stream is transmitted S109 as an encoded video stream 106 from the video stream processing device to the client device where the video stream is decoded S110 before the second processing S112. The second processing thus relates to application of the transmitted at least one 108 of the one or more shaders 105 to at least a subset of the video stream 102'.

The video stream 102' may later be displayed by a display 104. In case all of the one or more shades have been applied to the full video stream, the video stream 102' that is displayed by the display 104 is fully processed. However, since the two track design of the flow facilitate different priority levels for transmitting S109 the encoded video and for transmitting S106 the at least one 108 of the one or more shaders 105 to be applied in the second processing at the client device, it may be so that at least a part of the video stream 102' displayed at the display 104 is only half processed or not processed at all. E.g. the first frames of the video stream 102' may only be processed by a subset of the one or more shaders 105 that were set in S102 previously, and/or the shaders that have been applied to the first frames of the video stream may only have been applied to a subset of the first frames of the video stream. In other words, the second processing will not have been applied to the frames of the video stream already displayed before the shader(s) 108 needed for the second processing have been transmitted S106 to the client device. In real time applications, i.e. when the video is acquired, processed and displayed in real time, it may be advantageous to give the transmission S109 of the video stream priority over the transmission S106 of the shaders 108 for the second processing.

Figure 2:
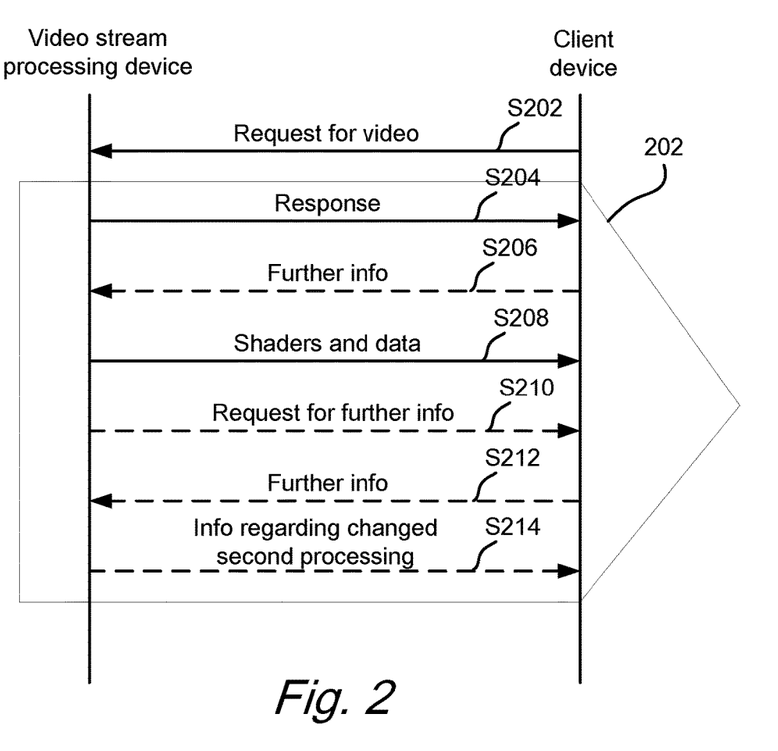
FIG. 2 shows by way of example messages and data sent between the video stream processing device and the client device in order to divide the processing of the video stream using shaders between the video stream processing device and the client device, FIG. 3a describes a scenario of processing of a video stream using shaders.

FIG. 2 describes by way of example the transmissions that take place between the video stream processing device and the client device. The first transmission is a request for video sent S202 from the client device and the video stream processing device, e.g. an http(s) request. When the request is received by the video stream processing device, the video stream processing device may immediately start to transmit video 202 to the client device. From the request for video, the video stream processing device may extract information regarding the client device such as if the client device has a GPU, the type of GPU, the operating system (OS) of the client device etc. This information may be used for deciding if the execution of the one or more shaders should be divided between the video stream processing device and the client device, and how the execution of the shaders in that case should be divided.

However, if further information is required for making the division of the processing, that video stream processing device may, in its response message sent S204 to the client device, request for more information regarding the client device. For example, the request for further information may be embedded in JavaScript code included in the http(s) response.

If such further information was requested, the client device may provide the requested information in a message transmitted S206 to the video stream processing device.

No matter if further info was requested S204 by the video stream processing device and later transmitted S206 to the video stream processing device, or if the information provided in the request for video from the client device were considered to be sufficient, after the dividing of the processing of the shader(s) is done, the at least one of the one or more shaders to be applied in the second processing at the client device, and data pertaining to the at least a subset of the video stream to which the second processing relate are transmitted S208 to the client device.

According to some embodiments, the first processing and/or the second processing dynamically changes over the duration of the video stream 202. This may be facilitated by that further information is transmitted S212 from the client device to the video stream processing device. This further information may for example pertain to a battery level of the client device and/or a processing power of the GPU of the client device. This type of information may already been transmitted S202 in the request for video or in the first message with further information transmitted S206 from the client device, but since the information pertain to properties of the client device which may dynamically change over a time period, it may be advantageous to take updated information into account when dividing the processing of the shaders between the video stream processing device and the client device. The further information may be transmitted S212 on the client device's own initiative or as a response to a transmission S210 of a request for such further information from the video stream processing device. Moreover, the first processing and/or the second processing may dynamically change based on information available directly at the video stream processing device, for example bandwidth of the connection between the video stream processing device and the client device, processing power of the GPU of the video stream processing device and/or battery level of the video stream processing device.

If the second processing is changed based on new information according to above, the at least one of the one or more shaders to be applied in the changed second processing at the client device, and data pertaining to the at least a subset of the video stream to which the changed second processing relate, are transmitted S214 to the client device.

According to some embodiments, if the second processing is changed based on the new information, but the same at least one of the one or more shaders is applied in the changed second processing compared to the original second processing, only data pertaining to the at least a subset of the video stream to which the changed second processing relate may be transmitted S214 to the client device. The same applies if only the at least one of the one or more shaders is changed, in that case only the at least one of the one or more shaders to be applied in the changed second processing at the client device may be transmitted S214 to the client device.

Moreover, if the second processing is changed in that for example one of the shaders that was previously applied in the second processing is no longer part of the second processing, the video stream processing device may just send a command to the client device to stop applying the removed shader.

It should be noted that the video stream processing may transmit video streams 202 to several client devices concurrently. In this case the division of the total processing between the first processing and the second processing may be done differently for different client devices depending on their capabilities and performance. Since the GPU of the video stream processing device may handle that several different shaders (e.g. vertex shaders, pixel shaders, compute shaders) are executed in parallel, it is possible to make such device specific divisions. Moreover it should be noted that different client devices may request different video streams (e.g. with different resolution, frame rate, and/or digitally zoomed in part of the field of view etc).

Figure 3A:
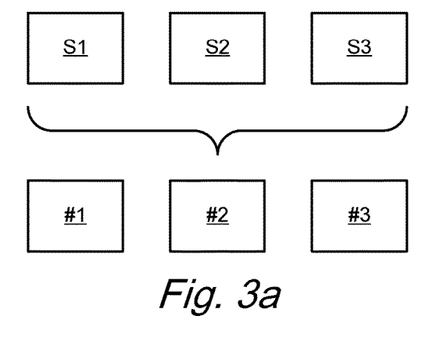
Figure 3B:
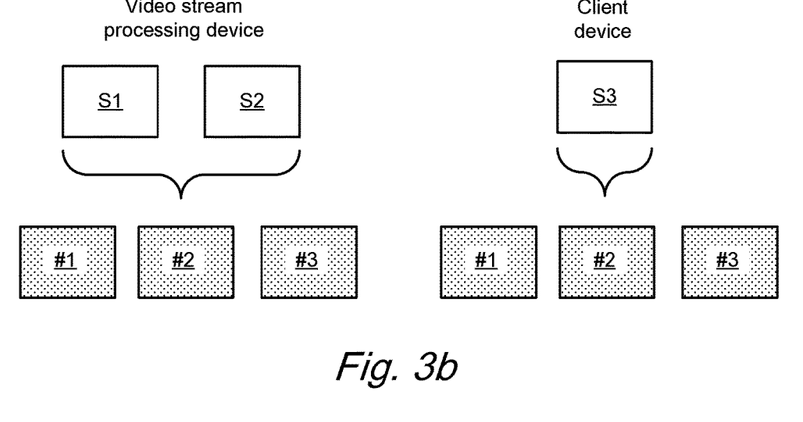
FIGS. 3b-c show different ways of dividing the processing described in FIG. 3a between the video stream processing device and the client device, FIG. 4a describes a scenario of processing of a video stream using shaders, FIG. 4b-c describe a dynamically changing division of the processing described in FIG. 4a between the video stream processing device and the client device, and FIG. 5 describe a system comprising the video stream processing device and the client device.

FIG. 3a describes a scenario of processing of a video stream using shaders. In this scenario, three shaders S1, S2, S3 are set to be applied to the video stream comprising three frames #1, #2, #3. In FIG. 3b, the processing of the three frames is divided between the video stream processing device and the client device as follows.

For both the first and the second processing, all of pixels in each of the frames #1, #2, #3 are processed, which is represented by that the areas representing the frames #1, #2, #3 in FIG. 3b are fully dotted. However, the first processing comprises applying two of the shaders S1, S2 to the frames #1, #2, #3 while the second processing comprises applying the third shader S3 to the frames #1, #2, #3. Consequently, the at least one shader S1, S2 applied in the first processing differs from the at least one shader S3 applied in the second processing.

Figure 3C:
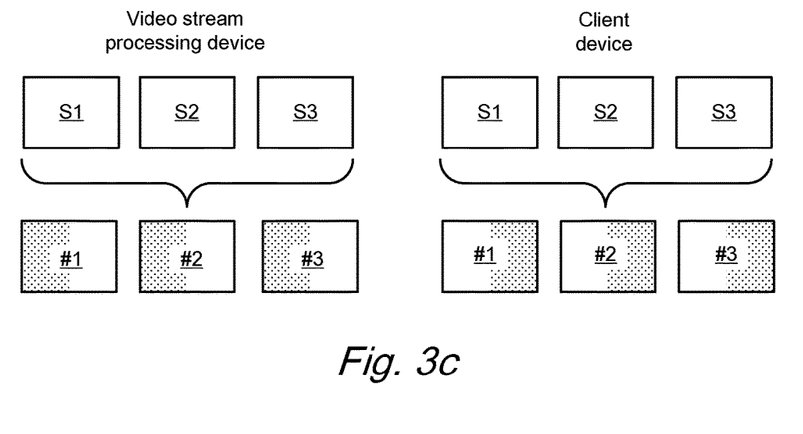

In FIG. 3c, a different type of division of the processing of the shaders is made. According to this embodiment all of the three shaders, S1, S2, S3 are applied in both of the first and the second processing. Instead the first and the second processing relate to different subsets of the frames #1, #2, #3 of the video stream. In FIG. 3c, the first processing relates to half of the pixels in each frame #1, #2, #3, while the second processing relates to the other half of the pixels of each frame #1, #2, #3. Consequently, the subset of the video stream to which the first processing relates differs from the subset of the video stream to which the second processing relates. Other ways of dividing the frames are equally possible, for example, every other frame can be processed on the video stream processing device while the processing on the client device takes care of the rest of the frames. Other possibilities comprise processing ⅔ of the pixels at the video stream processing device and the remaining ⅓ of the pixels at the client device or any other suitable way of dividing the pixels to be processed.

Figure 4A:
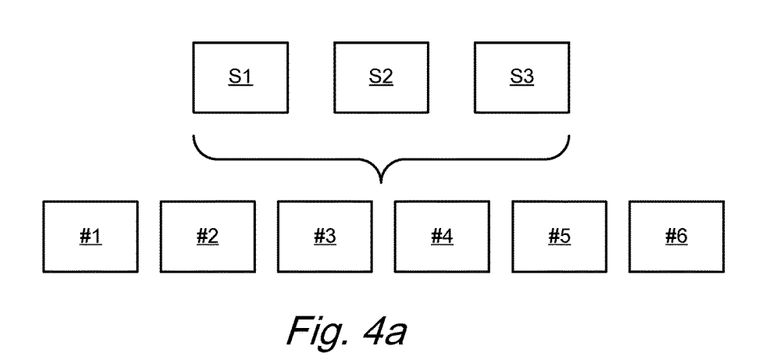

FIG. 4a describes another scenario of processing of a video stream using shaders. In this scenario, three shaders S1, S2, S3 are set to be applied to the video stream comprising six frames #1, #2, #3, #4, #5, #6.

Figure 4B:
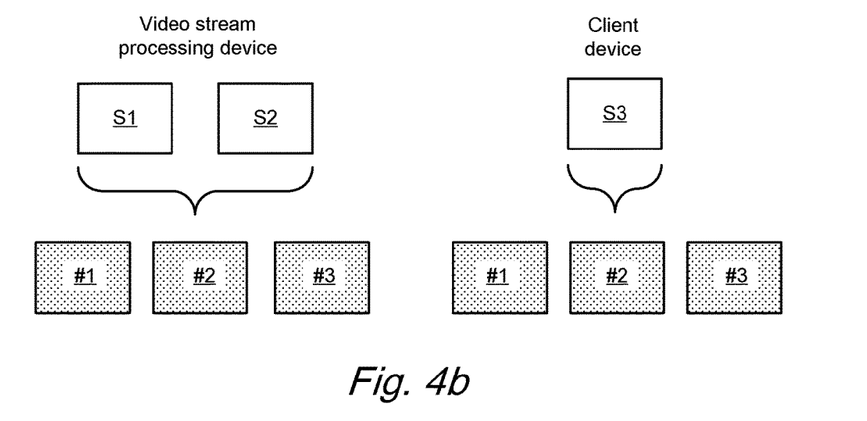

FIG. 4b describes the processing of the first three frames #1, #2, #3. For both the first and the second processing in FIG. 4b, all of pixels in each of the frames #1, #2, #3 are processed. However, the first processing comprises applying two of the shaders S1, S2 to the frames #1, #2, #3 while the second processing comprises applying the third shader S3 to the frames #1, #2, #3.

Figure 4C:
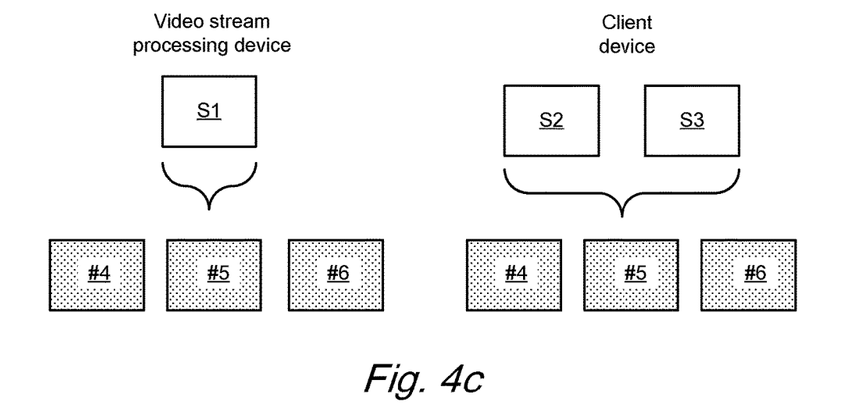

As described above, the first processing and/or the second processing may dynamically change over the duration of the video stream. This is described in FIG. 4c which describe the processing of the last three frames #4, #5, #6. In FIG. 4c, the first and the second processing have changed compared to the first and the second processing in FIG. 4b in that the execution of the second shader S2 have been moved and now is part of the second processing at the client device.

When dividing the processing of the shaders between the video processing device and the client device, further considerations, other than the ones describe above, may be made. For example, in the case one of the one or more shaders generates a privacy mask on the video stream, it may be advantageous if the privacy mask is generated in its entirety in the first processing. This reduces the risk of displaying sensitive video data to a viewer since the privacy mask is already applied in the encoded video sent to the client device.

Moreover, for shaders that requires low latency, and for shaders that relates to an interactive user interface at the client device or at a display connected to the client device, the execution of these shaders are advantageously performed at the client device.

In the FIGS. 3b-c and 4b-c the first processing is different from the second processing. However, as mentioned before, the first processing and the second processing may be identical, for example when the shader are performing incremental filtering of the video stream.

Figure 5:
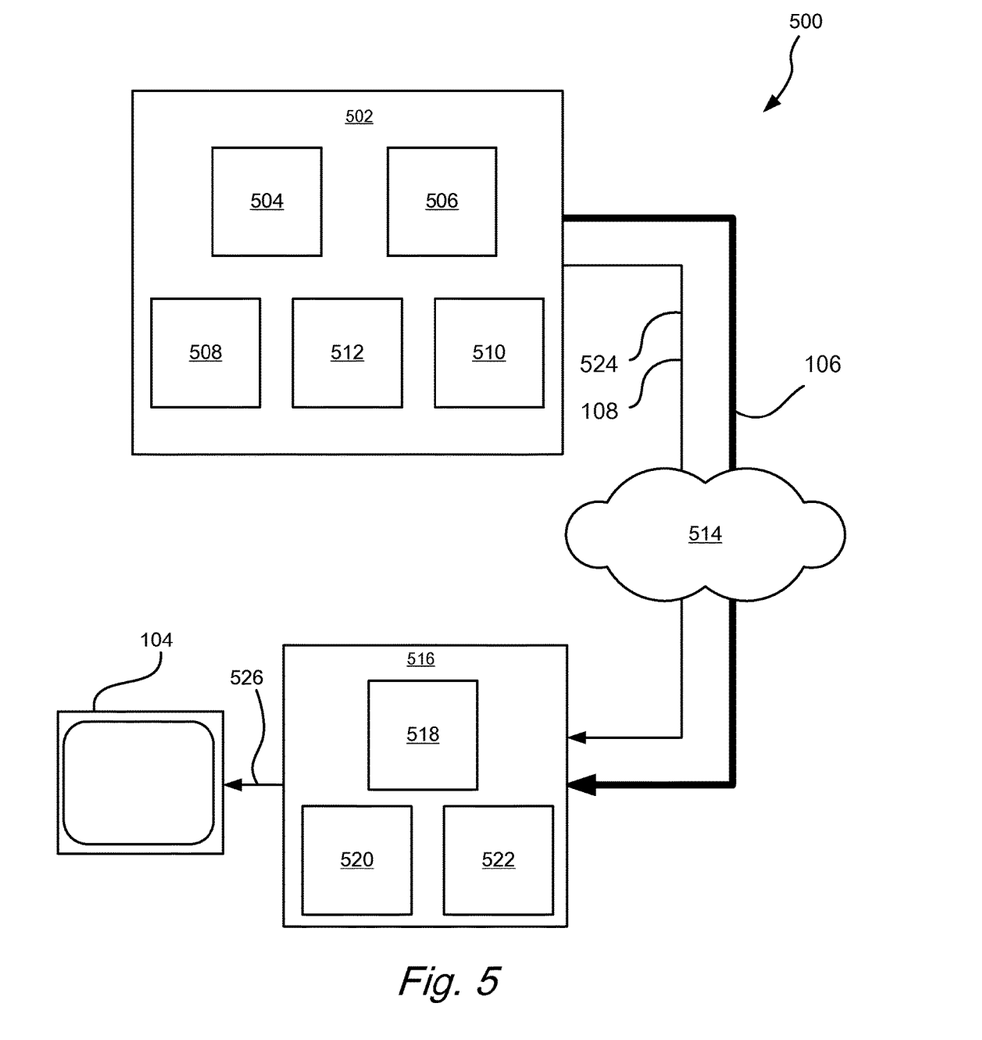

FIG. 5 describes a system 500 for processing a video stream. The system 500 comprises a video stream processing device 502 connected to a client device 516.

The video stream processing device comprises a memory 504 for storing one or more shaders to be applied to the video stream. The memory 504 may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The video stream processing device 502 further comprises a shader handling unit 506 which may be used for determining a first processing relating to at least a subset of the video stream to which at least one of the one or more shaders is to be applied, and a second processing relating to at least a subset of the video stream to which at least one of the one or more shaders is to applied. The shader handling unit 506 may take into account information pertaining to the video stream processing device, the client device and/or the connection between the video stream processing device and the client device when determining the first processing and the second processing. The shader handling unit 506 may also take the content of video stream into account, i.e. by employing video analytics algorithms or being provided with video analytics data from another device. For example, if it is determined that the video stream comprises human faces that need to be covered, i.e. by a privacy mask, the shader handling unit may determine that the first processing should comprise a shader for applying such privacy masks to the video stream. According to some embodiments, the shader handling unit is provided away from the video stream processing device. According to this embodiment, the first and the second processing are provided to the video stream processing device instead of determined in the video stream processing device.

The video stream processing device further comprises a GPU 508 for performing the first processing and an encoder 512 configured to encode the video stream into an encoded video stream 106. The encoded video stream 106 is then transmitted by a digital network module 510, via a digital network 514 to the client device 516. The digital network module 510 will also transmit the at least one 108 of the one or more shaders to be applied in the second processing and data 524 pertaining to the at least a subset of the video stream to which the second processing relate. For example, in the embodiment shown in FIG. 3c, the data 524 pertaining to the at least a subset of the video stream to which the second processing relate describes that the right half of each frame should be processed in the second processing. The shader handling unit 506 and the encoder 512 may be implemented in software and executed by one or more processors in the video stream processing device 502.

As described above, the transmission of the encoded video stream 106 may be prioritized over the transmission of the at least one 108 of the one or more shaders to be applied in the second processing and data 524 pertaining to the at least a subset of the video stream to which the second processing relate. This feature is in FIG. 5 described by that the line that represents the transmission of the video stream 106 is thicker compared to the line that represents the transmission of the shader(s) 108 and the data 524. This prioritization may be attained in a plurality of ways. For example, the transmission of the video stream 106 may be performed via a first network connection, and the transmission of shader(s) 108 and data 524 may be performed via a second network connection different from the first network connection. In this case, the connection for the transmission of the video stream 106 may have a higher bandwidth compared to the connection for transmission of the shader(s) 108 and the data 524. According to other embodiments, the video stream processing device 502 comprises a plurality of threads of execution, and wherein the transmission of the video stream 106 is performed by executing a first thread, and wherein the transmission of the shader(s) 108 applied in the second processing, and the data 524, is performed by executing a second thread different from the first thread.

The encoded video stream 106, the shader(s) 108 and the data 524 are received by a digital network module 522 in the client device. The digital network module 522 in the client device 516 is thus configured to receive, via the digital network 514, the at least one 108 of the one or more shaders to be applied in the second processing, data 524 pertaining to the at least a subset of the video stream to which the second processing relate, and the encoded video stream 106. The client device 516 further comprises a decoder 520 configured to decode the encoded video stream 106 into a video stream, and a GPU 518 for performing the second processing using the received at least one 108 of the one or more shaders and the received data 524 pertaining to the at least a subset of the video stream to which the second processing relate. Finally, the client device may be connected to a display 104 for displaying the processed video stream 526.

What is claimed is:

1. A method for processing a video stream in a system comprising a video stream processing device connected to a client device, comprising:

setting one or more shaders to be applied to the video stream, applying, by a first processing, at the video stream processing device, the one or more shaders to pixels of a first portion of each frame of the video stream, applying, by a second processing, at the client device, the one or more shaders to at least a second subset of pixels of a remaining portion of each frame of the video stream, wherein the one or more shaders applied in the second processing is transmitted from the video stream processing device to the client device, and wherein the video stream is transmitted as an encoded video stream from the video stream processing device to the client device where the video stream is decoded before the second processing.

2. The method of claim 1, wherein at least one of the first processing and the second processing depends on at least one from the group of:

a type of a graphics processing unit, GPU, of the client device, and a type of a graphics processing unit, GPU, of the video stream processing device.

3. The method of claim 1, wherein at least one of the first processing and the second processing changes over the duration of the video stream.

4. The method of claim 3, wherein at least one of the first processing and the second processing dynamically changes over the duration of the video stream based on information pertaining to at least one from a group consisting of:

bandwidth of the connection between the video stream processing device and the client device, battery level of the client device, battery level of the video stream processing device, processing power of the GPU of the client device, and processing power of the GPU of the video stream processing device.

5. The method of claim 1, wherein the video stream is transmitted as an encoded video stream from the video stream processing device to the client device where the video stream is decoded before the second processing.

6. The method of claim 5, wherein the transmission of the video stream has a first priority level, wherein transmission of the at least one of the one or more shaders applied in the second processing from the video stream processing device to the client device has a second priority level lower than the first priority level, and wherein an order of performing the transmissions are based on their respective priority level.

7. The method of claim of claim 6, wherein the transmission of the video stream is performed via a first network connection, and wherein the transmission of the at least one of the one or more shaders applied in the second processing from the video stream processing device to the client device is performed via a second network connection different from the first network connection.

8. The method of claim 1, further comprising the steps of:

receiving, at the video stream processing device, from the client device, a request for a video stream to be transmitted from the video stream processing device to the client device, and extracting, at the video stream processing device, information pertaining to the client device from the request, the information pertaining to the client device comprises at least information of a type of a GPU of the client device, wherein the first processing and/or the second processing depends on the extracted information.

9. The method of claim 1, wherein, for each Particular frame of the video stream, the first portion comprises half of the pixels of the particular frame, and the remaining portion comprises the other half of the pixels of the particular frame.

10. A system for processing a video stream, comprising:
a video stream processing device comprising:
  a memory for storing one or more shaders to be applied to the video stream, wherein the one or more shaders are for post-processing of the video stream,
  a shader handling unit for determining:
    a first processing relating to pixels of a first portion of each frame in the video stream to which at least one of the one or more shaders is to be applied, and
    a second processing relating to pixels of a remaining portion of each frame in the video stream to which at least one of the one or more shaders is to be applied,
  a graphical processing unit, GPU, for performing the first processing to apply the one or more shaders to the pixels of the first portion of each frame of the video stream,
  an encoder configured to encode the video stream into an encoded video stream, and,
  a digital network module configured to transmit the one or more shaders to be applied in the second processing, and the at least a subset of the video stream to which the second processing relates, and
a client device comprising:
  a digital network module configured to receive, via the digital network, the one or more shaders to be applied in the second processing, data pertaining to the at least a subset of the video stream to which the second processing relate, and the encoded video stream,
  a decoder configured to decode the encoded video stream into a video stream, and
  a GPU for applying, by the second processing, the received one or more shaders, to the pixels of the remaining portion of each frame of the video stream,
  wherein the video stream is transmitted as an encoded video stream from the video stream processing device to the client device where the video stream is decoded at the client device before the second processing.

11. The system of claim 10, wherein, for each particular frame of the video stream, the first portion comprises half of the pixels of the particular frame, and the remaining portion comprises the other half of the pixels of the particular frame.

12. A computer program product comprising a non-transitory computer-readable storage medium with instructions stored thereon to carry out the method according to claim 1 when the instructions are executed by a device having processing capability.

13. The computer program product of claim 12, wherein the first processing is different from the second processing.

14. The computer program product of claim 12, wherein the at least a subset of the video stream to which the first processing relate differs from the at least a subset of the video stream to which the second processing relate.

15. The computer program product of claim 12, wherein at least one of the first processing and the second processing changes over the duration of the video stream.

16. The computer program product of claim 12, wherein the video stream is transmitted as an encoded video stream from the video stream processing device to the client device where the video stream is decoded before the second processing, and wherein the transmission of the video stream has a first priority level, wherein transmission of the at least one of the one or more shaders applied in the second processing from the video stream processing device to the client device has a second priority level lower than the first priority level, and wherein an order of performing the transmissions are based on their respective priority level.

* * * * *